(12) United States Patent
Perisic et al.

(10) Patent No.: US 8,339,094 B2
(45) Date of Patent: Dec. 25, 2012

(54) METHODS, SYSTEMS AND APPARATUS FOR OVERMODULATION OF A FIVE-PHASE MACHINE

(75) Inventors: Milun Perisic, Torrance, CA (US); Silva Hiti, Redondo Beach, CA (US); Gabriel Gallegos-Lopez, Torrance, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 427 days.

(21) Appl. No.: 12/722,166

(22) Filed: Mar. 11, 2010

(65) Prior Publication Data

US 2011/0221367 A1 Sep. 15, 2011

(51) Int. Cl.
*H02P 23/00* (2006.01)
(52) U.S. Cl. .......................... 318/810; 318/811; 318/606
(58) Field of Classification Search .................. 318/810, 318/811, 606, 400.02, 400.17, 400.01, 434, 318/805
See application file for complete search history.

(56) References Cited

U.S. PATENT DOCUMENTS

2006/0113939 A1* 6/2006 Saren ........................... 318/434
2008/0079377 A1* 4/2008 Williams et al. ......... 318/400.17

OTHER PUBLICATIONS

Parsa, L, et al. "Performance Improvement of Permanent Magnet AC Motors," May 2005, A Dissertation submitted to the Office of Graduate Studies of Texas A&M University.
Ryu, H.-M., et al. "Analysis of Multiphase Space Vector Pulse-Width Modulation Based on Multiple d-q Spaces Concept," IEEE Transactions on Power Electronics, Nov. 2005, pp. 1364-1371, vol. 20, No. 6.
Holtz, J., et al. "On Continuous Control of PWM Inverters in the Overmodulation Range Including the Six-Step Mode," IEEE Transactions on Power Electronics, Oct. 1993, pp. 546-553, vol. 8. No. 4.
Zhao, Y., et al. "Modeling and Control of a Multiphase Induction Machine with Structural Unbalance," IEEE Transactions on Energy Conversion, Sep. 1996, pp. 570-577, vol. 11, No. 3.
Toliyat, H., et al. "A Novel Direct Torque Control (DTC) Method for Five-Phase Induction Machines," IEEE Applied Power Electronics Conference and Exposition, Aug. 2002, pp. 162-168, vol. 1.
Robert-Dehault, E., et al. "Study of a 5-Phases Synchronous Machine fed by PWM Inverters Under Fault Conditions," Proc. of ICEM, Aug. 2002, pp. 1-2.
Oleschuk, V., "Synchronous Flexible Overmodulation Control of Five-Phase Inverters," Proceedings of the ICEM, 2008, pp. 1-6.
Fu, J-R., et al. Disturbance-Free Operation of a Multiphase Current-Regulated Motor Drive with an Opened Phase, IEEE Transactions on Industry Applications, Sep./Oct. 1994, pp. 1267-1274, vol. 30, No. 5.

* cited by examiner

*Primary Examiner* — Karen Masih
(74) *Attorney, Agent, or Firm* — Ingrassia Fisher & Lorenz, P.C.

(57) ABSTRACT

Methods, system and apparatus are provided for overmodulation of a five-phase machine in a vector controlled motor drive system that includes a five-phase PWM controlled inverter module that drives the five-phase machine. Techniques for overmodulating a reference voltage vector are provided to optimize voltage command signals that control a five-phase inverter module to increase output voltages generated by the five-phase inverter module.

19 Claims, 9 Drawing Sheets

| VOLTAGE SWITCHING VECTOR | Sa | Sb | Sc | Sd | Se |
|---|---|---|---|---|---|
| 0 | 0 | 0 | 0 | 0 | 0 |
| 1 | 1 | 1 | 0 | 0 | 1 |
| 11 | 1 | 0 | 0 | 0 | 0 |
| 21 | 0 | 1 | 0 | 0 | 1 |
| 2 | 1 | 1 | 0 | 0 | 0 |
| 12 | 1 | 1 | 1 | 0 | 1 |
| 22 | 1 | 1 | 0 | 1 | 0 |
| 3 | 1 | 1 | 1 | 0 | 0 |
| 13 | 0 | 1 | 0 | 0 | 0 |
| 23 | 1 | 0 | 1 | 0 | 0 |
| 4 | 0 | 1 | 1 | 0 | 0 |
| 14 | 1 | 1 | 1 | 1 | 0 |
| 24 | 0 | 1 | 1 | 0 | 1 |
| 5 | 0 | 1 | 1 | 1 | 0 |
| 15 | 0 | 0 | 1 | 0 | 0 |
| 25 | 0 | 1 | 0 | 1 | 0 |
| 6 | 0 | 0 | 1 | 1 | 0 |
| 16 | 0 | 1 | 1 | 1 | 1 |
| 26 | 1 | 0 | 1 | 1 | 0 |
| 7 | 0 | 0 | 1 | 1 | 1 |
| 17 | 0 | 0 | 0 | 1 | 0 |
| 27 | 0 | 0 | 1 | 0 | 1 |
| 8 | 0 | 0 | 0 | 1 | 1 |
| 18 | 1 | 0 | 1 | 1 | 1 |
| 28 | 0 | 1 | 0 | 1 | 1 |
| 9 | 1 | 0 | 0 | 1 | 1 |
| 19 | 0 | 0 | 0 | 0 | 1 |
| 29 | 1 | 0 | 0 | 1 | 0 |
| 10 | 1 | 0 | 0 | 0 | 1 |
| 20 | 1 | 1 | 0 | 1 | 1 |
| 30 | 1 | 0 | 1 | 0 | 1 |
| 31 | 1 | 1 | 1 | 1 | 1 |

Fig. 3C

METHODS, SYSTEMS AND APPARATUS FOR OVERMODULATION OF A FIVE-PHASE MACHINE

STATEMENT REGARDING FEDERALLY SPONSORED RESEARCH OR DEVELOPMENT

This invention was made with Government support under DE-FC26-07NT43123, awarded by the US-Department of Energy. The Government has certain rights in this invention.

TECHNICAL FIELD

Embodiments of the present invention generally relate to techniques for controlling operation of multi-phase systems, such as those that implement five-phase machines, and more particularly relate to methods, systems and apparatus for overmodulation in a five-phase system.

BACKGROUND OF THE INVENTION

Electric machines are utilized in a wide variety of applications. For example, hybrid/electric vehicles (HEVs) typically include an electric traction drive system that includes an alternating current (AC) electric motor which is driven by a power converter with a direct current (DC) power source, such as a storage battery. Motor windings of the AC electric motor can be coupled to inverter sub-modules of a power inverter module (PIM). Each inverter sub-module includes a pair of switches that switch in a complementary manner to perform a rapid switching function to convert the DC power to AC power. This AC power drives the AC electric motor, which in turn drives a shaft of HEV's drivetrain. Traditional HEVs implement two three-phase pulse width modulated (PWM) inverter modules and two three-phase AC machines (e.g., AC motors) each being driven by a corresponding one of the three-phase PWM inverter modules that it is coupled to.

Many modern high performance AC motor drives use the principle of field oriented control (FOC) or "vector" control to control operation of the AC electric motor. In particular, vector control is often used in variable frequency drives to control the torque applied to the shaft (and thus finally the speed) of an AC electric motor by controlling the current fed to the AC electric motor. In short, stator phase currents are measured and converted into a corresponding complex space vector. This current vector is then transformed to a coordinate system rotating with the rotor of the AC electric motor.

Recently, researchers have investigated the possibility of using multi-phase machines in various applications including electric vehicles. As used herein, the term "multi-phase" refers to more than three-phases, and can be used to refer to electric machines that have three or more phases. One example of a multi-phase electric machine is a five-phase AC machine. In a five-phase system, a five-phase PWM inverter module drives one or more five-phase AC machine(s).

While the possibility of using five-phase systems (e.g., five-phase inverter and motor configurations) in HEVs is being explored, a lot of work remains to be done before these systems can actually be implemented. For instance, in the context of five-phase electrical drives implemented in an HEV, high torque for any given rotation speed is desirable since the maximum torque available allows faster acceleration and deceleration of the HEV, and for better dynamic performance during driving.

Accordingly, it is desirable to increase output voltage generated by the inverter module that drives a five-phase AC machine since this increases mechanical torque generated by the five-phase machine, which can improve machine efficiency and performance, as well as utilization of the DC voltage source. Other desirable features and characteristics of the present invention will become apparent from the subsequent detailed description and the appended claims, taken in conjunction with the accompanying drawings and the foregoing technical field and background

SUMMARY

Embodiments of the present invention relate to methods, systems and apparatus for controlling operation of a five-phase machine in a vector controlled motor drive system that includes a five-phase PWM controlled inverter module that drives the five-phase machine. In one embodiment, methods, systems and apparatus for overmodulating a reference voltage vector are provided to optimize voltage command signals that control a five-phase inverter module to increase output voltages generated by the five-phase inverter module.

In accordance with this embodiment, to determine whether the reference voltage vector is within a linear modulation region, it is determined whether a magnitude (Vr) of the reference voltage vector is less than or equal to a voltage threshold (Vlin) for a linear modulation region. If the reference voltage vector is determined to be within the first overmodulation region, a modified magnitude (Vr*) of the reference voltage vector based on the magnitude (Vr) of the reference voltage vector and a correction factor coefficient k(MI), while an angle ($\alpha$) of the reference voltage vector is unchanged.

When the magnitude (Vr) of the reference voltage vector is determined to be greater than the voltage threshold (Vlin) for the linear modulation region, it is determined whether the reference voltage vector is within a first overmodulation region or a second overmodulation region by determining whether the magnitude (Vr) of the reference voltage vector is less than or equal to a voltage threshold (VI) for a first overmodulation region. If the magnitude (Vr) of the reference voltage vector is greater than the voltage threshold (VI) for the first overmodulation region, the reference voltage vector is determined to be within the second overmodulation region, and a modified magnitude (Vr*) of the reference voltage vector and a modified angle ($\alpha$*) of the reference voltage vector are generated. The modified angle ($\alpha$*) of the reference voltage vector is different than the angle ($\alpha$) of the reference voltage vector.

In the second overmodulation region, the modified magnitude (Vr*) and the modified angle ($\alpha$*) of the reference voltage vector change based on the angular range of the sector.

For example, when the angle ($\alpha$) of the reference voltage vector is in a first angular range, the modified magnitude (Vr*) of the reference voltage vector is determined (e.g., computed) based on a first active voltage switching vector ($V_n$) and the modified angle ($\alpha$*) of the reference voltage vector is determined based on the sector number (n).

On the other hand, when the angle ($\alpha$) of the reference voltage vector is in a second angular range, the modified magnitude (Vr*) of the reference voltage vector is determined based on the linear region voltage threshold (Vlin), the angle ($\alpha$) of the reference voltage vector, the sector number (n) and a hold angle $\alpha_h$(MI) that is a function of modulation index. The modified angle ($\alpha$*) of the reference voltage vector is determined based on the angle ($\alpha$) of the reference voltage vector, the sector number (n) and the hold angle $\alpha_h$(MI).

By contrast, when the angle ($\alpha$) of the reference voltage vector is in a third angular range, the modified magnitude (Vr*) of the reference voltage vector is determined based on a second active voltage switching vector ($V_{n+1}$), and the modified angle ($\alpha^*$) of the reference voltage vector is determined based on the sector number (n).

DESCRIPTION OF THE DRAWINGS

Embodiments of the present invention will hereinafter be described in conjunction with the following drawing figures, wherein like numerals denote like elements.

FIG. 3C is a table that summarizes different combinations of on/off states of switching vector signals that are used to represent each voltage switching vector that is shown in FIGS. 3A and 3B;

DESCRIPTION OF EXEMPLARY EMBODIMENTS

Figure 1:
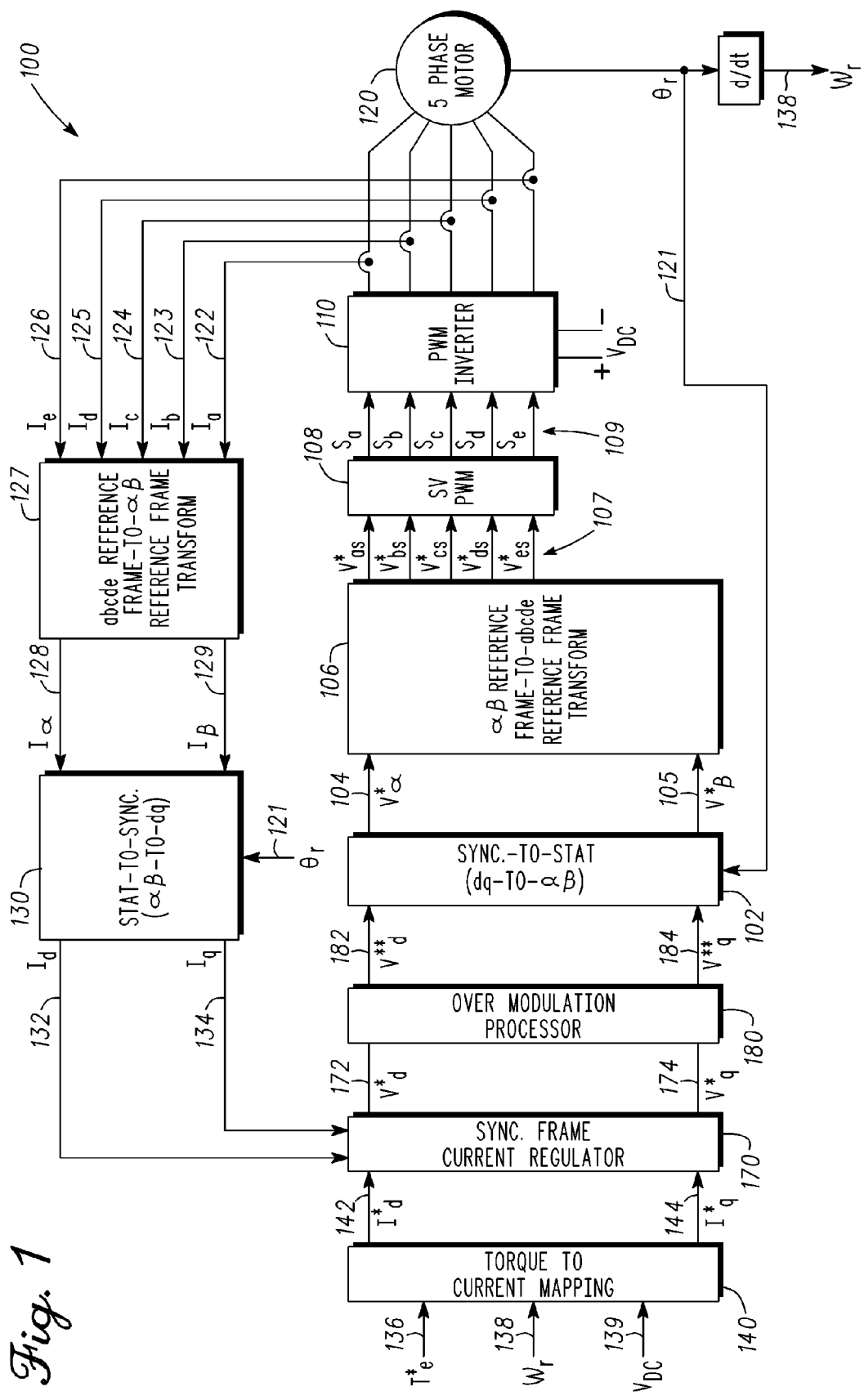
FIG. 1 is a block diagram of one example of a vector controlled motor drive system in accordance with some of the disclosed embodiments.

As used herein, the word "exemplary" means "serving as an example, instance, or illustration." The following detailed description is merely exemplary in nature and is not intended to limit the invention or the application and uses of the invention. Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary or the following detailed description.

Before describing in detail embodiments that are in accordance with the present invention, it should be observed that the embodiments reside primarily in combinations of method steps and apparatus components related to controlling operation of a five-phase system. It will be appreciated that embodiments of the invention described herein can be implemented using hardware, software or a combination thereof.

The control circuits described herein may comprise various components, modules, circuits and other logic which can be implemented using a combination of analog and/or digital circuits, discrete or integrated analog or digital electronic circuits or combinations thereof. As used herein the term "module" refers to a device, a circuit, an electrical component, and/or a software based component for performing a task. In some implementations, the control circuits described herein can be implemented using one or more application specific integrated circuits (ASICs), one or more microprocessors, and/or one or more digital signal processor (DSP) based circuits when implementing part or all of the control logic in such circuits. It will be appreciated that embodiments of the invention described herein may be comprised of one or more conventional processors and unique stored program instructions that control the one or more processors to implement, in conjunction with certain non-processor circuits, some, most, or all of the functions for controlling operation of a five-phase system, as described herein. As such, these functions may be interpreted as steps of a method for controlling operation of a five-phase system. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions will be described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Overview

Embodiments of the present invention relate to methods, systems and apparatus for overmodulation in a five-phase system. The disclosed methods, systems and apparatus for controlling operation of a five-phase system and regulating current provided to a five-phase machine can be implemented in operating environments such as a hybrid/electric vehicle (HEV). In the exemplary implementations which will now be described, the control techniques and technologies will be described as applied to a hybrid/electric vehicle. However, it will be appreciated by those skilled in the art that the same or similar techniques and technologies can be applied in the context of other systems in which it is desirable to control operation of a five-phase system and regulate current provided to a five-phase machine in that system when one or more phases has experienced a fault or failed. In this regard, any of the concepts disclosed here can be applied generally to "vehicles," and as used herein, the term "vehicle" broadly refers to a non-living transport mechanism having an AC machine. Examples of such vehicles include automobiles such as buses, cars, trucks, sport utility vehicles, vans, vehicles that do not travel on land such as mechanical water vehicles including watercraft, hovercraft, sailcraft, boats, ships, mechanical under water vehicles including submarines, mechanical air vehicles including aircraft and spacecraft, mechanical rail vehicles such as trains, trams, and trolleys, etc. In addition, the term "vehicle" is not limited by any specific propulsion technology such as gasoline or diesel fuel. Rather, vehicles also include hybrid vehicles, battery electric vehicles, hydrogen vehicles, and vehicles which operate using various other alternative fuels.

As used herein, the term "alternating current (AC) machine" generally refers to "a device or apparatus that converts electrical energy to mechanical energy or vice versa." AC machines can generally be classified into synchronous AC machines and asynchronous AC machines. Synchronous AC machines can include permanent magnet machines and reluctance machines. Permanent magnet machines include surface mount permanent magnet machines (SMPMMs) and interior permanent magnet machines (IPMMs). Asynchronous AC machines include induction machines. Although an AC machine can be an AC motor (e.g., apparatus used to convert AC electrical energy power at its input to produce to mechanical energy or power), an AC machine is not limited to being an AC motor, but can also encompass generators that are used to convert mechanical energy or power at its prime mover into electrical AC energy or power at its output. Any of the machines can be an AC motor or an AC generator. An AC motor is an electric motor that is driven by an alternating current. In some implementations, an AC motor includes an outside stationary stator having coils supplied with alternating current to produce a rotating magnetic field, and an inside rotor attached to the output shaft that is given a torque by the rotating field. Depending on the type of rotor used, AC motors can be classified as synchronous or asynchronous.

FIG. 1 is a block diagram of one example of a vector controlled motor drive system 100 in accordance with the disclosed embodiments. The system 100 controls a five-phase AC machine 120 via a five-phase pulse width modulated (PWM) inverter module 110 coupled to the five-phase AC machine 120 so that the five-phase AC machine 120 can efficiently use a DC input voltage (Vdc) provided to the five-phase PWM inverter module 110 by adjusting current commands that control the five-phase AC machine 120. In one particular implementation, the vector controlled motor drive system 100 can be used to control torque in an HEV.

In the following description of one particular non-limiting implementation, the five-phase AC machine 120 is described as a five-phase AC powered motor 120, and in particular a five-phase, permanent magnet synchronous AC powered motor (or more broadly as a motor 120); however, it should be appreciated that the illustrated embodiment is only one non-limiting example of the types of AC machines that the disclosed embodiments can be applied to, and further that the disclosed embodiments can be applied to any type of multiphase AC machine that includes five or more phases.

The five-phase AC motor 120 is coupled to the five-phase PWM inverter module 110 via five inverter poles and generates mechanical power (Torque X Speed) based on five-phase sinusoidal current signals received from the PWM inverter module 110. In some implementations, the angular position of a rotor (Or) of the five-phase AC motor 120 or "shaft position" is measured using a position sensor (not illustrated), and in other implementations, the angular position of a rotor (Or) of the five-phase AC motor 120 can be estimated without using a position sensor by using sensorless position estimation techniques.

Figure 2:
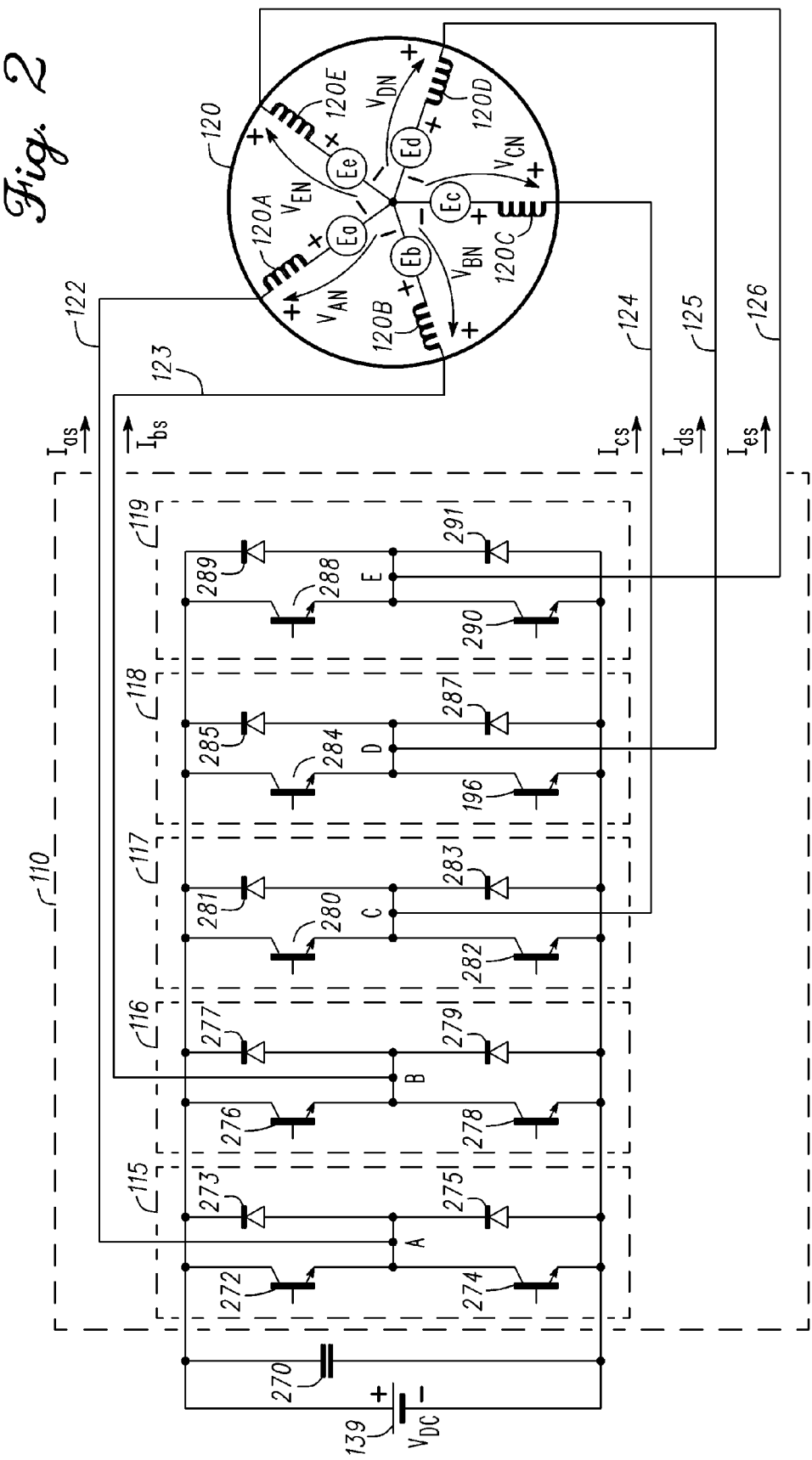
FIG. 2 is a block diagram of a portion of a motor drive system including a five-phase voltage source inverter module connected to a five-phase AC motor.

Prior to describing operation details of the system 100, a more detailed description of one exemplary implementation of the five-phase voltage source inverter 110 will be provided (including how it is connected to the five-phase AC motor 120) with reference to FIG. 2.

FIG. 2 is a block diagram of a portion of a motor drive system including a five-phase voltage source inverter 110 connected to a five-phase AC motor 120. It should be noted that the five-phase voltage source inverter 110 and the five-phase motor 120 in FIG. 1 are not limited to this implementation; rather, FIG. 2 is merely one example of how the five-phase voltage source inverter 110 and the five-phase motor 120 in FIG. 1 could be implemented in one particular embodiment.

As illustrated in FIG. 2, the five-phase AC motor 120 has five stator or motor windings 120a, 120b, 120c, 120d, 120e connected to motor terminals A, B, C, D, E, and the five-phase PWM inverter module 110 includes a capacitor 270 and five inverter sub-modules 115-119. In this embodiment, in phase A the inverter sub-module 115 is coupled to motor winding 120a, in phase B the inverter sub-module 116 is coupled to motor winding 120b, in phase C the inverter sub-module 117 is coupled to motor winding 120c, in phase D the inverter sub-module 118 is coupled to motor winding 120d, and in phase E the inverter sub-module 119 is coupled to motor winding 120e. The motor windings A, B, C, D, E (120a, 120b, 120c, 120d, 120e) that are coupled together at a neutral point (N). The current into motor winding A 120a flows out motor windings B-E 120b-120e, the current into motor winding B 120b flows out motor windings A, C, D, E 120a and 120c-e, the current into motor winding C 120c flows out motor windings A, B, D, E 120a, 120b, 120d, 120e, the current into motor winding D 120d flows out motor windings A, B, C, E 120a-c and 120e and the current into motor winding E 120e flows out motor windings A-D 120a-d.

The resultant phase or stator currents (Ia-Ie) 122, 123, 124, 125, 126 flow through respective stator windings 120a-e. The phase to neutral voltages across each of the stator windings 120a-120e are respectively designated as $V_{an}$, $V_{bn}$, $V_{cn}$, $V_{dn}$, $V_{en}$, with the back electromotive force (EMF) voltages generated in each of the stator windings 120a-120e respectively shown as the voltages $E_a$, $E_b$, $E_c$, $E_d$, $E_e$ produced by ideal voltage sources, each respectively shown connected in series with stator windings 120a-120e. As is well known, these back EMF voltages $E_a$, $E_b$, $E_c$, $E_d$, $E_e$ are the voltages induced in the respective stator windings 120a-120e by the rotation of the permanent magnet rotor. Although not shown, the motor 120 is coupled to a drive shaft.

The inverter 110 includes a capacitor 270, a first inverter sub-module 115 comprising a dual switch 272/273, 274/275, a second inverter sub-module 116 comprising a dual switch 276/277, 278/279, a third inverter sub-module 117 comprising a dual switch 280/281, 282/283, a fourth inverter sub-module 118 comprising a dual switch 284/285, 286/287, and a fifth inverter sub-module 119 comprising a dual switch 288/289, 290/291. As such, inverter 110 has ten solid state controllable switching devices 272, 274, 276, 278, 280, 282, 284, 286, 288, 290 and ten diodes 273, 275, 277, 279, 281, 283, 285, 287, 289, 291 to appropriately switch compound voltage ($V_{DC}$) and provide five-phase energization of the stator windings 120a, 120b, 120c, 120d, 120e of the five-phase AC motor 120.

Although not illustrated, a closed loop motor controller can receive motor command signals and motor operating signals from the motor 120, and generate control signals for controlling the switching of solid state switching devices 272, 274, 276, 278, 280, 282, 284, 286, 288, 290 within the inverter sub-modules 115-128. Examples of these switching vectors used to construct these control signals will be described below. By providing appropriate control signals to the individual inverter sub-modules 115-119, the closed loop motor controller controls switching of solid state switching devices 272, 274, 276, 278, 280, 282, 284, 286, 288, 290 within the inverter sub-modules 115-119 and thereby control the outputs of the inverter sub-modules 115-119 that are provided to motor windings 120a-120e, respectively. The resultant stator currents (Ia . . . Ie) 122-126 that are generated by the inverter sub-modules 115-119 of the five-phase inverter module 110 are provided to motor windings 120a, 120b, 120c, 120d, 120e. The voltages as $V_{an}$, $V_{bn}$, $V_{cn}$, $V_{dn}$, $V_{en}$, $E_a$, $E_b$, $E_c$, $E_d$, $E_e$ and the voltage at node N fluctuate over time depending on the open/close states of switches 272, 274, 276, 278, 280, 282, 284, 286, 288, 290 in the inverter sub-modules 115-119 of the inverter module 110, as will be described below.

Referring again to FIG. 1, the vector control motor drive system 100 includes a torque-to-current mapping module 140, a synchronous (SYNC.) frame current regulator module 170, an overmodulation preprocessor 180, a synchronous-to-stationary (SYNC.-TO-STAT.) transformation module 102, an αβ reference frame-to-abcde reference frame (αβ-to-abcde) transformation module 106, a Space Vector (SV) PWM module 108, a five-phase PWM inverter 110, an abcde reference frame-to-αβ reference frame (abcde-to-αβ) transformation module 127, a stationary-to-synchronous (STAT.-TO-SYNC.) transformation module 130.

The torque-to-current mapping module 140 receives a torque command signal (Te*) 136, angular rotation speed (ωr) 138 of the shaft that is generated based on the derivative of the rotor/shaft position output (θr) 121, and the DC input voltage ($V_{DC}$) 139 as inputs, along with possibly a variety of other system parameters depending upon implementation. The torque-to-current mapping module 140 uses these inputs to generate a d-axis current command (Id*) 142 and a q-axis current command (Iq*) 144 that will cause the motor 120 to generate the commanded torque (Te*) at speed (wr) 138. In particular, the torque-to-current mapping module 140 uses the inputs to map the torque command signal (Te*) 136 to a d-axis current command signal (Id*) 142 and a q-axis current command signal (Iq*) 144. The synchronous reference frame d-axis and q-axis current command signals (Id*, Iq*) 142, 144 are DC commands that have a constant value as a function of time.

The abcde-to-αβ transformation module 127 receives the measured five-phase stationary reference frame feedback stator currents (Ia ... Ie) 122-126 that are fedback from motor 120. The abcde-to-αβ transformation module 127 uses these five-phase stationary reference frame feedback stator currents 122-126 to perform an abcde reference frame-to-αβ reference frame transformation to transform the five-phase stationary reference frame feedback stator currents 122-126 into stationary reference frame feedback stator currents (Iα, Iβ) 128, 129. The abcde-to-αβ transformation can be performed using any known transformation technique including using the matrices defined in equation (1) below.

$$\begin{bmatrix} I_\alpha \\ I_\beta \\ I_0 \end{bmatrix} = \frac{2}{5} \begin{bmatrix} 1 & \cos\left(\frac{2\pi}{5}\right) & \cos\left(\frac{4\pi}{5}\right) & \cos\left(\frac{6\pi}{5}\right) & \cos\left(\frac{8\pi}{5}\right) \\ 0 & \sin\left(\frac{2\pi}{5}\right) & \sin\left(\frac{4\pi}{5}\right) & \sin\left(\frac{6\pi}{5}\right) & \sin\left(\frac{8\pi}{5}\right) \\ \frac{1}{\sqrt{2}} & \frac{1}{\sqrt{2}} & \frac{1}{\sqrt{2}} & \frac{1}{\sqrt{2}} & \frac{1}{\sqrt{2}} \end{bmatrix} \times \begin{bmatrix} I_a \\ I_b \\ I_c \\ I_d \\ I_e \end{bmatrix} \quad (1)$$

In equation (1) the column vector that represents the five-phase stationary reference frame feedback stator currents 122-126 is multiplied by a transformation matrix and scaling factor to generate a column vector that represents the stationary reference frame feedback stator currents (Iα, Iβ) 128, 129.

The stationary-to-synchronous transformation module 130 receives the stationary reference frame feedback stator currents (Iα, Iβ) 128, 129 and the rotor angular position (θr) 121 and generates (e.g., processes or converts) these stationary reference frame feedback stator currents (Iα, Iβ) 128, 129 to generate a synchronous reference frame d-axis current signal (Id) 132 and a synchronous reference frame q-axis current signal (Iq) 134. The process of stationary-to-synchronous conversion is well-known in the art and for sake of brevity will not be described in detail.

The synchronous frame current regulator module 170 receives the synchronous reference frame d-axis current signal (Id) 132, the synchronous reference frame q-axis current signal (Iq) 134, the d-axis current command (Id*) 142 and the q-axis current command (Iq*) 144, and uses these signals to generate a synchronous reference frame d-axis voltage command signal (Vd*) 172 and a synchronous reference frame q-axis voltage command signal (Vq*) 174. The synchronous reference frame voltage command signals (Vd*, Vq*) 172, 174 are DC commands that have a constant value as a function of time for steady state operation. Because the current commands are DC signals in the synchronous reference frame they are easier to regulate in comparison to AC stationary reference frame current commands. The process of current to voltage conversion can be implemented as a Proportional-Integral (PI) controller, which is known in the art and for sake of brevity will not be described in detail.

The overmodulation preprocessor 180 receives the synchronous reference frame d-axis voltage command signal (Vd*) 172 and the synchronous reference frame q-axis voltage command signal (Vq*) 174. As will be explained below with reference to FIGS. 3-9, the overmodulation preprocessor 180 processes these voltage command signals 172, 174 to generate a modified synchronous reference frame d-axis voltage command signal (Vd) 182 and a modified synchronous reference frame q-axis voltage command signal (Vq) 184. The modified voltage command signals (Vd, Vq) 182, 184 are optimized such that output voltage signals generated by the inverter module 110 can be increased via overmodulation. The processing performed by the overmodulation preprocessor 180 will be described below with reference to FIGS. 3-8.

The synchronous-to-stationary transformation module 102 receives the modified voltage command signals (Vd, Vq) 182, 184 as inputs along with the rotor position output (θr) 121. In response to the modified voltage command signals (Vd, Vq) 182, 184 and the measured (or estimated) rotor position angle (θr) 121, the synchronous-to-stationary transformation module 102 performs a dq-to-αβ transformation to generate an α-axis stationary reference frame voltage command signal (Vα*) 104 and a β-axis stationary reference frame voltage command signal (Vβ*) 105. The stationary reference frame α-axis and β-axis voltage command signals (Vα*, Vβ*) 104, 105 are in the stationary reference frame and therefore have values that vary as a sine wave as a function of time. The process of synchronous-to-stationary conversion is well-known in the art and for sake of brevity will not be described in detail.

The αβ-to-abcde transformation module 106 receives the stationary reference frame voltage command signals (Vα*, Vβ*) 104, 105, and based on these signals, generates stationary reference frame voltage command signals (Vas* ... Ves*) 107 that are sent to the Space Vector (SV) PWM module 108. The αβ-to-abcde transformation can be performed using any known transformation technique including using the matrices defined in equation (2) below.

$$\begin{bmatrix} V_a \\ V_b \\ V_c \\ V_d \\ V_e \end{bmatrix} = \begin{bmatrix} 1 & 0 & \frac{1}{\sqrt{2}} \\ \cos\left(\frac{2\pi}{5}\right) & \sin\left(\frac{2\pi}{5}\right) & \frac{1}{\sqrt{2}} \\ \cos\left(\frac{4\pi}{5}\right) & \sin\left(\frac{4\pi}{5}\right) & \frac{1}{\sqrt{2}} \\ \cos\left(\frac{6\pi}{5}\right) & \sin\left(\frac{6\pi}{5}\right) & \frac{1}{\sqrt{2}} \\ \cos\left(\frac{8\pi}{5}\right) & \sin\left(\frac{8\pi}{5}\right) & \frac{1}{\sqrt{2}} \end{bmatrix} \times \begin{bmatrix} V_\alpha \\ V_\beta \\ V_0 \end{bmatrix} \quad (2)$$

In equation (2) the column vector that represents the stationary reference frame voltage command signals (Vα*, Vβ*) 104, 105 is multiplied by a transformation matrix and scaling factor to generate a column vector that represents the stationary reference frame voltage command signals (Vas* . . . Ves*) 107.

The five-phase PWM inverter module 110 is coupled to the SVPWM module 108. The SVPWM module 108 is used for the control of pulse width modulation (PWM) of the signals 107. The SVPWM module 108 receives the stationary reference frame voltage command signals (Vas* . . . Ves*) 107 as inputs, and uses these signals to generate switching vector signals (Sa . . . Se) 109, which it provides to the five-phase PWM inverter module 110. The particular SV modulation algorithm implemented in the SV PWM module 108 can be any known SV modulation algorithm.

The switching vector signals (Sa . . . Se) 109 control the switching states of switches in PWM inverter 110 to generate five-phase voltage commands at each phase A, B, C, D, E. The five-phase PWM inverter module 110 receives the DC input voltage (Vdc) and switching vector signals (Sa . . . Se) 109, and uses them to generate five-phase alternating current (AC) voltage signal waveforms at inverter poles that drive the five-phase AC machine 120 at varying speeds (ωr).

The five-phase interior permanent magnet synchronous machine 120 receives the five-phase voltage signals generated by the PWM inverter 110 and generates a motor output at the commanded torque Te* 136. In this particular implementation, the machine 120 comprises a five-phase interior permanent-magnet synchronous motor (IPMSM) 120, but can be any five-phase AC machine.

Although not illustrated in FIG. 1, the system 100 may also include a gear coupled to and driven by a shaft of the five-phase AC machine 120. The measured feedback stator currents (Ia-Ie) are sensed, sampled and provided to the abcde-to-αβ transformation module 127 as described above.

Voltage Switching Vectors

Space Vector Pulse Width Modulation (SVPWM) are implemented at the 108 and inverter module 110 to control of pulse width modulation (PWM) to create alternating current (AC) waveforms that drive the five-phase AC powered machine 120 at varying speeds based on the DC input 139.

Figure 3A:
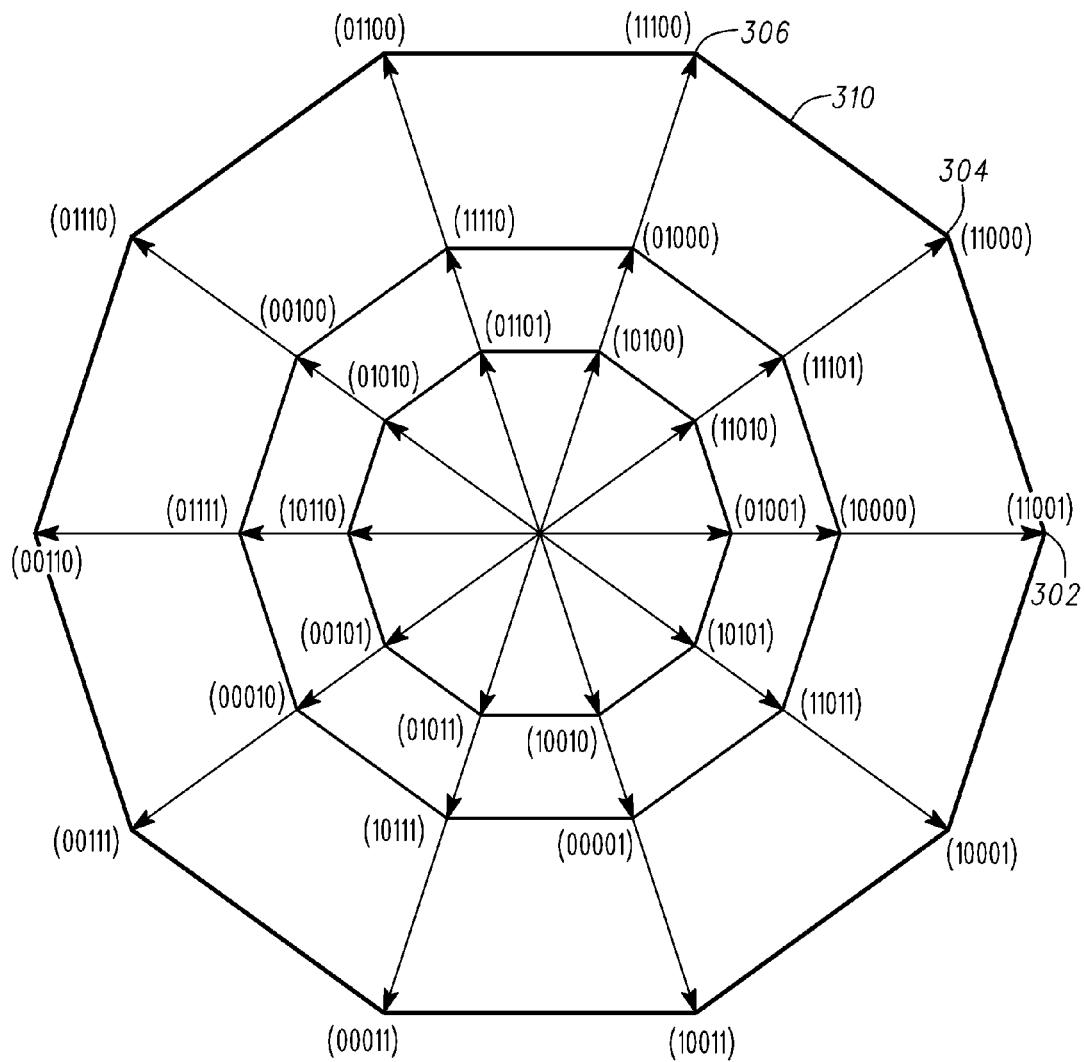
FIGS. 3A and 3B are representations of a state space voltage switching vector diagram that illustrate thirty of thirty-two voltage switching vectors for driving switches in a five-phase inverter module.
Figure 3B:
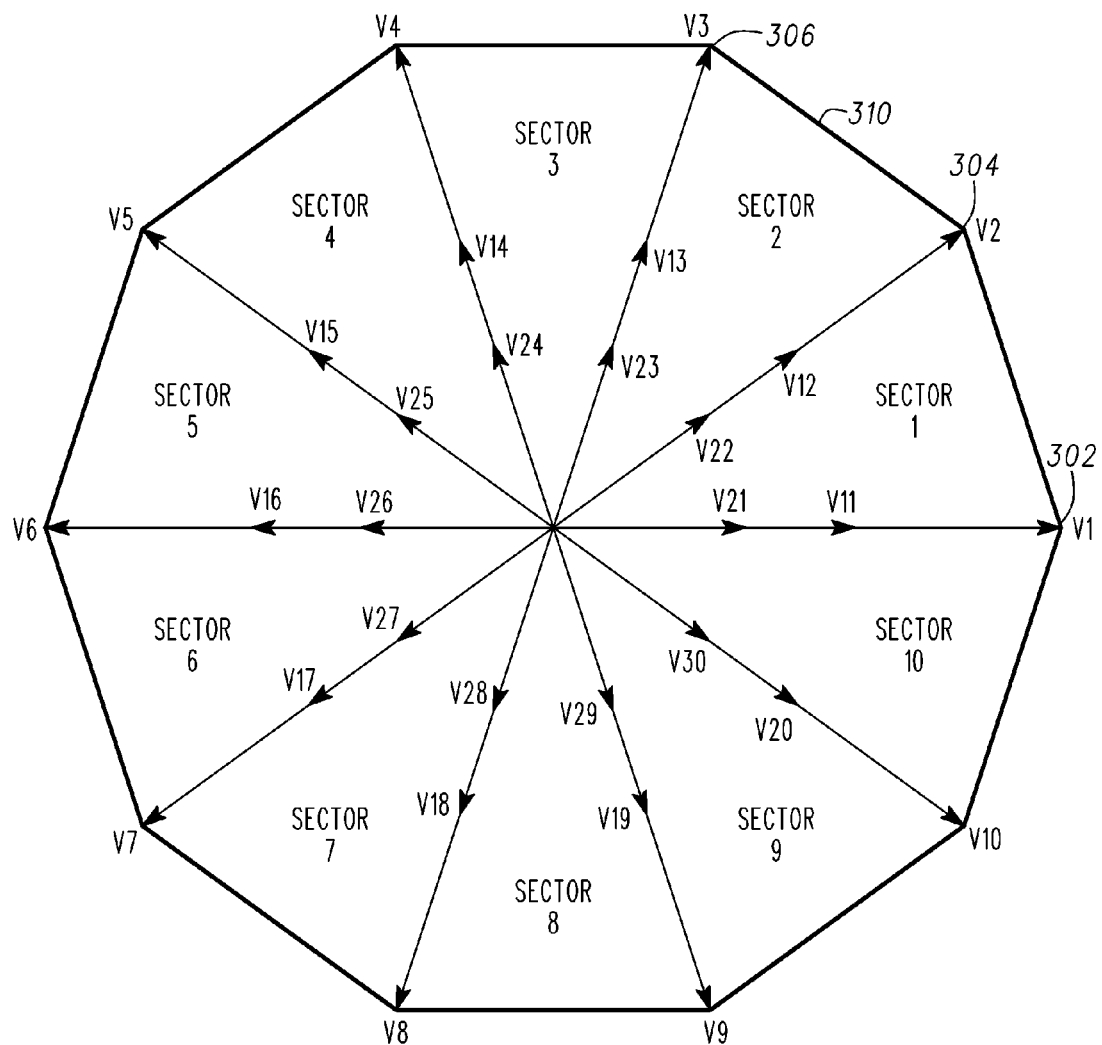

FIGS. 3A and 3B are representations of a state space voltage switching vector diagram that illustrate thirty of thirty-two "state space" voltage switching vectors (V1 . . . V30) for driving switches in a five-phase inverter module 110. FIG. 3C is a table that summarizes different combinations of on/off (0/1) states of switching vector signals (Sa . . . Se) 109 that are used to represent each voltage switching vector that is shown in FIGS. 3A and 3B. As described above, the switching states of switches in PWM inverter 110 are controlled using voltage switching vectors to generate five-phase voltage commands 107. The five-phase voltage source inverter module 110 must be controlled so that at no time are both switches in the same inverter sub-module 115-119 or "leg" are turned on to prevent the DC supply from being shorted. As such, the switches in the same inverter sub-module 115-119 are operated such that when one is off the other is on and vice versa. As illustrated in FIG. 3A and as summarized in FIG. 3C, this leads to thirty-two possible voltage switching vectors for the inverter 110 with thirty active voltage switching vectors (V1 through V30) and two zero voltage switching vectors (V0 and V31). Each voltage switching vector (V0 . . . V31) is used to represent the switching status of switches of the five-phase voltage source inverter 110 in FIG. 2. In other words, each of the thirty-two voltage switching vectors (V0 . . . V31) represents a different combination of possible switch states of the switches in the five-phase voltage source inverter 110.

To explain further, in a given phase (A . . . E) at any particular time, one of the switches is off and the other one of the switches is on (i.e., the two switches in a particular inverter sub-module must have opposite on/off states). For instance, as one example with respect to phase A, when switch 272 is on, switch 274 is off, and vice-versa.

As such, for a particular inverter sub-module, the on/off status of the two switches in that inverter sub-module can be represented as a binary 1 or binary 0. For example, when the upper switch in a given phase is on (and the lower switch is off) the value of a bit will be one (1), and when the lower switch in a given phase is on (and the upper switch is off) the value of a bit will be zero (0). For instance, as an example with respect to phase A, when the upper switch 272 is on (and the lower switch 274 is off) the value of the first bit (from left to right) will be one (1).

Accordingly, in FIG. 3A, each of the active voltage switching vectors (V1 . . . V30) is illustrated along with a corresponding five bit binary number in the parenthesis next to that active voltage switching vector. In FIG. 3B, each voltage switching vector identifier (V1 . . . V30) has an identifier that identifies a corresponding switch state associated with the particular voltage switching vectors. The first bit (from left to right) represents the state of the switches 272, 274 for inverter sub-module 115 for phase A, the second bit (from left to right) represents the state of the switches 276, 278 for inverter sub-module 116 for phase B, the third bit (from left to right) represents the state of the switches 280, 282 for inverter sub-module 117 for phase C, and so on.

Thus, the active voltage switching vector (V1) represents a case when, with respect to phase A, the upper switch 272 is on (and the lower switch 274 is off) and the value of the first bit (from left to right) will be one (1); with respect to phase B, the upper switch 276 is on (and the lower switch 278 is off) and the value of the second bit (from left to right) will be one (1), with respect to phase C; the upper switch 280 is off (and the lower switch 282 is on) and the value of the third bit (from left to right) will be zero (0), with respect to phase D; the upper switch 284 is off (and the lower switch 286 is on) and the value of the fourth bit (from left to right) will be zero (0), and with respect to phase E; the upper switch 278 is on (and the lower switch 290 is off) and the value of the fifth bit (from left to right) will be one (1). Hence, the active voltage switching vector (V1) has a corresponding switch state bit pattern (11001). In other words, the switch state represented by voltage switching vector (V1) is (11001), meaning phases A, B, E are high, while phases C and D are low.

The zero voltage switching vector (V0) represents a switching scenario where, with respect to phases A-E, all of the upper switches are off (and all of the lower switches are on). Hence, the zero voltage switching vector (V0) has a corresponding switch state bit pattern (00000), which indicates that all of the upper switches in all five phases A-E are off and that all of the lower switches in all five phases A-E are on. Similarly, the zero voltage switching vector (V31) has a corresponding switch state bit pattern (11111), which indicates that all of the upper switches in all five phases A-E are on and that all of the lower switches in all five phases A-E are off.

Figure 4:
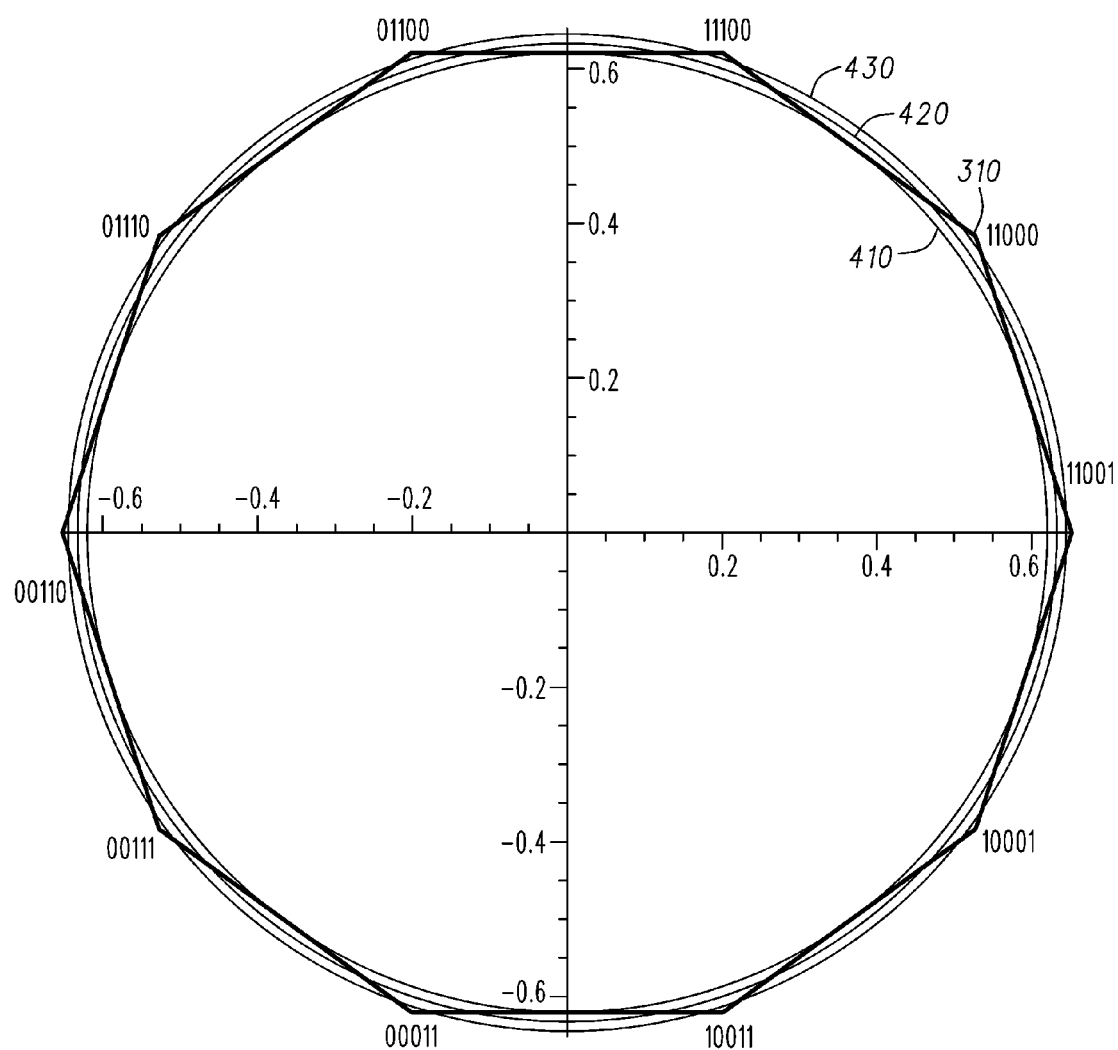
FIG. 4 is a diagram that illustrates a decagon region formed by joining ten large voltage switching vectors normalized to DC link voltage and three distinct modulation regions.

As indicated in FIG. 3B, the voltage switching vector diagram includes ten (10) sectors with sector numbers (1 . . . 10) increasing in the counter-clockwise direction. Each of the sectors (1 . . . 10) is defined between two of the ten active voltage switching vectors (V1 through V10). These ten sectors are used to control the switching of switches in the PWM inverter 110 to control the current in the motor 120 based on the operating conditions. FIG. 4 is a diagram that illustrates a decagon region formed by joining ten large voltage switching vectors normalized to DC link voltage and three distinct modulation regions. As illustrated in FIG. 4, only the ten large voltage switching vectors (i.e., V1, V2, V3, V4, V5, V6, V7, V8, V9, V10) and the zero voltage switching vectors (V0, V31) are utilized to maximize fundamental output voltage for a given DC link voltage. As will be described further below, in each PWM cycle, the two most adjacent active voltage switching vectors (i.e., those bounding the sector) for any particular sector and the two zero voltage switching vectors (V0, V31) are used to generate PWM waveforms called modified switching vector signals (Sa . . . Se) 109 (FIG. 1) for phases A . . . E, respectively. The switching vector signals (Sa . . . Se) 109 are provided to the gates of the switches in the five-phase voltage source inverter 110 in FIG. 2 to control switching of these switches.

As is also illustrated in FIGS. 3A, 3B and 4, when the ten large voltage switching vectors (i.e., V1, V2, V3, V4, V5, V6, V7, V8, V9, V10) are joined via lines, this forms a decagon region 310.

FIG. 4 further illustrates that the decagon region 310 defines three distinct modulation regions 410, 420, 430 (indicated via circles) that will be referred to below as a linear modulation region 410, a first overmodulation region 420, and a second overmodulation region 430. Similar modulation regions are defined amongst any combination of two large voltage switching vectors. Each of the modulation regions 410, 420, 430 will be described in greater detail below with reference to FIG. 5A, which illustrates a blown up view of sector numbers 1-3.

Figure 5B:
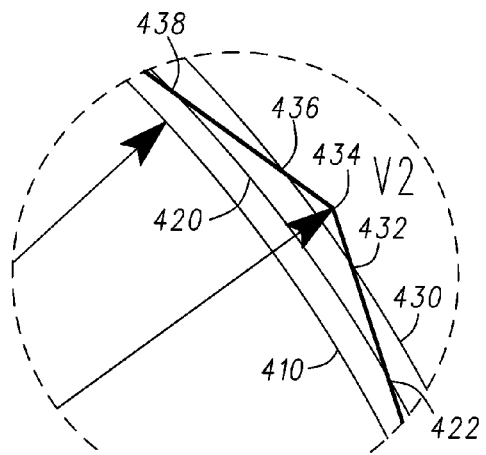
FIG. 5B is a blown up view of modulation regions of FIG. 5A in greater detail.
Figure 5A:
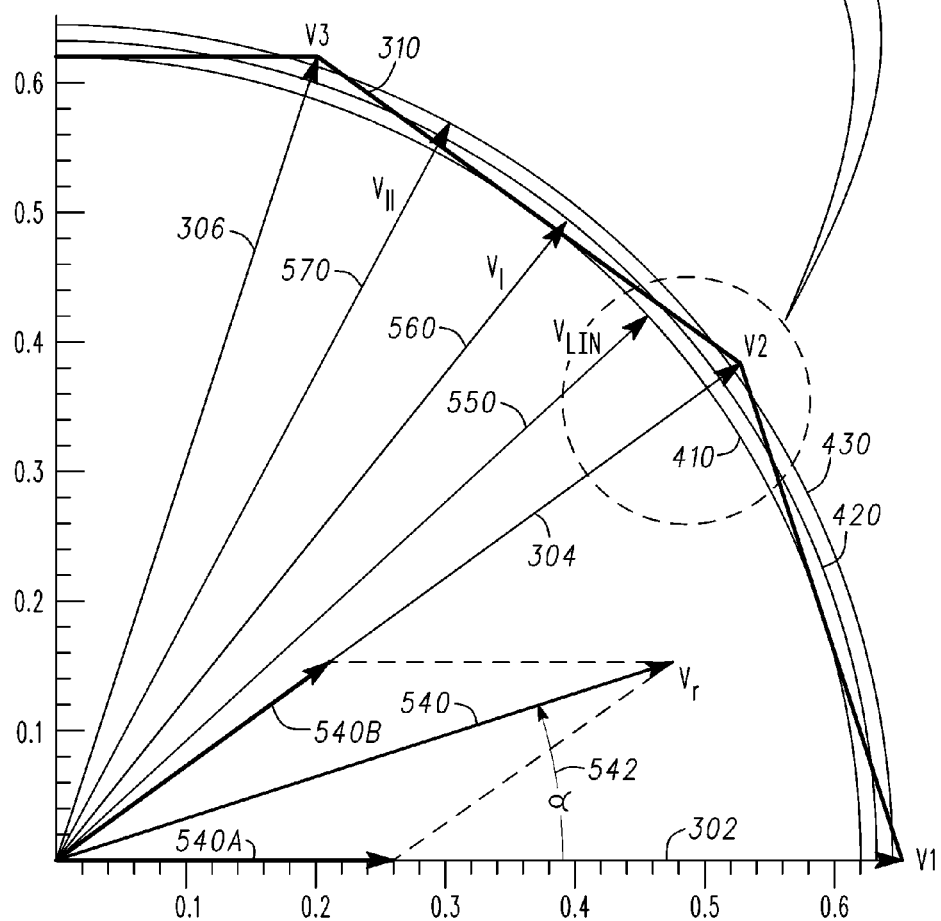
FIG. 5A is a blown up view of sector numbers of FIG. 4 that illustrates modulation regions of FIG. 4 in greater detail.

FIG. 5A is a blown up view of sector numbers 1-3 of FIG. 4 that illustrates modulation regions and 410, 420, 430 in greater detail. In addition, FIG. 5A also illustrates a reference voltage vector having a magnitude (Vr) 540 and angle (α) 542, a linear region voltage threshold (Vlin) 550 for a linear modulation region 410, a first voltage threshold (VI) 560 for a first overmodulation region 420, a second voltage threshold (VII) 570 for a second overmodulation region 430, and switching vectors V1 (302), V2 (304), and V3 (306). FIG. 5B is a blown up view of modulation regions 410, 420, 430 of FIG. 5A in greater detail and shows intersection points 422, 432, 434, 436, 438 between the decagon region 310 and the linear modulation region 410, the first overmodulation region 420, and the second overmodulation region 430.

Performance of PWM can be characterized by modulation index (MI), which can be defined as a normalized fundamental reference voltage. As used herein, "modulation index (MI)" is the ratio of the peak fundamental phase voltage (Vr) to the maximum available voltage. The MI can be defined via the equation $$MI = \frac{V_r}{V_{dc}} \cdot \frac{\pi}{2},$$

where $V_r = \sqrt{V_d^2 + V_q^2}$, and Vd and Vq are the d-axis voltage command signal (Vd*) 172 and the q-axis voltage command signal (Vq*) 174 that are output by current controller 170. The range of modulation index is from 0 to 1.

In the first sector (sector 1) between V1 and V2, the magnitude (Vr) of the reference voltage vector can be represented in equation (3) as a function of time as follows:

$$V_r T_{pwm} = V_1 t_1 + V_2 t_2 + V_0 (T_{pwm} - t_1 - t_2) \quad (3)$$

where V1 is the large voltage switching vector (V1) which has a corresponding switch state bit pattern (11001), V2 is the large voltage switching vector (V2) which has a corresponding switch state bit pattern (11000), and V0 is the zero voltage switching vector (V0) which has a corresponding switch state bit pattern (00000). The time (t1) is the time duration that the large voltage switching vector (V1) is used to generate the reference voltage vector, the time (t2) is the time duration that that the large voltage switching vector (V2) is used to generate the reference voltage vector, and the period ($T_{pwm}$) is the fundamental pulse width modulation period. The time period $T_{pwm} - t_1 - t_2$ is the time duration that the zero voltage switching vector (V0) is used to generate the reference voltage vector. These times will be described in greater detail below with respect to each modulation region.

The large voltage switching vector (V1) has a magnitude that can be represented in equation (4) as a function of the DC link voltage (Vdc) as follows:

$$V_1 = \left(\frac{1}{5} + \frac{1}{\sqrt{5}}\right) V_{dc} \quad (4)$$

The large voltage switching vector (V2) can be represented in equation (5) as a function of the large voltage switching vector (V1) as follows:

$$V_2 = V_1 e^{j\frac{\pi}{5}} \quad (5)$$

The linear region voltage threshold (Vlin) 550 for the linear modulation region 410 has a magnitude that can be represented in equation (6) as a function of the large voltage switching vector (V1) and the DC link voltage (Vdc) as follows:

$$V_{lin} = V_1 \cos\left(\frac{\pi}{10}\right) = \frac{\sqrt{5 + 2\sqrt{5}}}{5} V_{dc} \quad (6)$$

The first voltage threshold (VI) 560 for the first overmodulation region 420 has a magnitude that can be represented in equation (7) as a function of the DC link voltage (Vdc) as follows:

$$V_I = \frac{\sqrt{5 + 2\sqrt{5}}}{\pi} \ln\left(\frac{2 + \sqrt{5}}{\sqrt{5}}\right) V_{dc} \quad (7)$$

The second voltage threshold (VII) 570 for the second overmodulation region 430 has a magnitude that can be represented in equation (8) as a function of the DC link voltage (Vdc) as follows:

$$V_{II} = \frac{2}{\pi} V_{dc} \quad (8)$$

In a five-phase system, three important modulation regions 410, 420, 430 can be defined in terms of their modulation index. The regions are defined as the linear modulation region 410, the first overmodulation region 420, and the second overmodulation region 430. In the linear modulation region 410 the modulation index ranges between zero and 0.9669 as described in expression (9) as follows:

$$MI \in \left[0, \frac{\pi\sqrt{5+2\sqrt{5}}}{10}\right] = [0, 0.9669] \tag{9}$$

In the first overmodulation region 420 the modulation index ranges between 0.9669 and 0.98322 as described in expression (10) as follows:

$$MI \in \frac{\pi\sqrt{5+2\sqrt{5}}}{10}\left[1, \frac{5}{\pi}\ln\left(\frac{2+\sqrt{5}}{\sqrt{5}}\right)\right] = [0.9669, 0.9832] \tag{10}$$

In the second overmodulation region 430 the modulation index ranges between 0.98322 and 1.0000 as described in expression (11) as follows:

$$MI \in [0.9832, 1] \tag{11}.$$

Overmodulation of a Five-Phase Machine

Having identified the three important modulation regions 410, 420, 430, methods, systems and apparatus for overmodulation will now be described.

In accordance with the disclosed embodiments, methods, systems and apparatus are provided for increasing output voltage generated by the inverter module 110 via overmodulation. In brief, overmodulation is used to optimize voltage commands 182, 184 that control the five-phase PWM controlled inverter module 110 to increase inverter output voltage that is provided to the five-phase machine 120. By increasing the inverter output voltage through overmodulation, the maximum available mechanical torque generated by the five-phase machine 120 can be improved/increased, which in turn can improve/increase machine efficiency and improve dynamic performance of five-phase machine. Moreover, this can also increase the modulation index (MI), which allows for the utilization of the battery voltage (Vdc) to be improved. Methods, systems and apparatus for overmodulation in accordance with some embodiments will be described below with reference to FIGS. 6-8.

Figure 6:
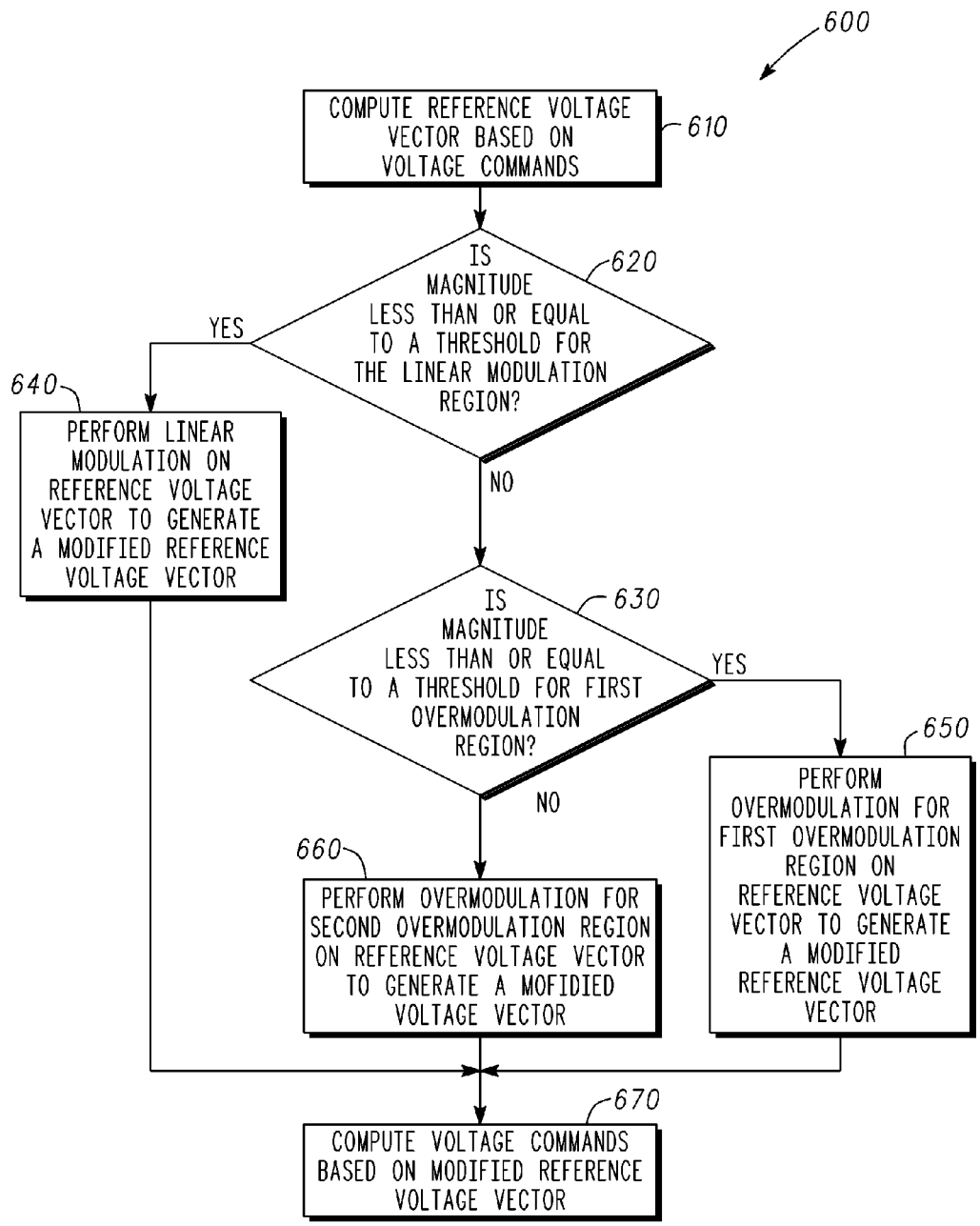
FIG. 6 is a flowchart that illustrates a method for overmodulating a reference voltage vector that represents voltage commands that control a five-phase inverter module in accordance with some of the disclosed embodiments.

FIG. 6 is a flowchart that illustrates a method 600 for overmodulating a reference voltage vector (Vr, α) that represents voltage commands 182, 184 that control a five-phase inverter module 110 that drives a five-phase AC machine in a five-phase system in accordance with some of the disclosed embodiments. Overmodulation optimizes the voltage commands 182, 184 that control the five-phase inverter module 110 to increase voltage signals generated by the five-phase inverter module 110. The steps of method 600 can be performed by the overmodulation preprocessor 180 of FIG. 1.

Method 600 begins at step 610, where the overmodulation preprocessor 180 receives the synchronous reference frame d-axis and q-axis voltage command signals (Vd*, Vq*) 172, 174 from the current regulator 170. The overmodulation preprocessor 180 uses the voltage command signals (Vd*, Vq*) 172, 174 to determine the magnitude (Vr) 540 and angle (α) 542 of the reference voltage vector. In one embodiment, the magnitude (Vr) 540 of the reference voltage vector can be computed using equation (12) and the angle (α) 542 of the reference voltage vector can be computed using equation (13) as follows:

$$V_r = \sqrt{V_d^2 + V_q^2} \tag{12}$$

$$\alpha = \arctan\left(\frac{V_q}{V_d}\right) \tag{13}$$

At step 620, the overmodulation preprocessor 180 determines whether the magnitude (Vr) 540 of the reference voltage vector is less than or equal to a voltage threshold (Vlin) 550 for the linear modulation region 410. This way the overmodulation preprocessor 180 can determine whether the reference voltage vector is within the linear modulation region 410.

Linear Modulation Region

When the magnitude (Vr) 540 of the reference voltage vector is determined to be less than or equal to the voltage threshold (Vlin) 550 for the linear modulation region 410 this means that the reference voltage vector is within the linear modulation region 410, and that overmodulation does not need to be implemented. As such, the magnitude (Vr) 540 and angle (α) 542 of the reference voltage vector do not need to be modified and remain unchanged, and the method 600 proceeds to step 640, where the overmodulation preprocessor 180 sets a value of a modified magnitude (Vr*) 602 equal to the magnitude (Vr) 540 of the reference voltage vector and sets a value of a modified angle (α*) 604 equal to the angle (α) 542 of the reference voltage vector. The method then proceeds to step 670 as will be described below.

Non-Linear Modulation Regions

When the overmodulation preprocessor 180 determines that the magnitude (Vr) 540 of the reference voltage vector is greater than the linear region voltage threshold (Vlin) 550 this means that the reference voltage vector is outside of the linear modulation region 410. As such, the method 600 proceeds to step 630 so that the overmodulation preprocessor 180 can determine whether the reference voltage vector is within the first overmodulation region 420 or the second overmodulation region 430 by determining whether the magnitude (Vr) 540 of the reference voltage vector is less than or equal to a first voltage threshold (VI) 560 for the first overmodulation region 420.

First Overmodulation Region

As detailed above, in the first overmodulation region 420 the modulation index ranges between 0.9669 and 0.98322. As will be described in more detail below, when the reference voltage vector is determined to be in the first overmodulation region 420, the magnitude (Vr) 540 of the reference voltage vector is modified, while the angle (α) 542 of the reference voltage vector is unchanged.

To explain further with reference to FIG. 5A, in the first overmodulation region 420, whenever operating conditions require that the magnitude (Vr) of the reference voltage vector should exceed or "extend past" past a boundary of the decagon region 310, the actual voltage switching vector will be limited to decagon region 310. In other words, as the magnitude (Vr) of the reference voltage vector starts increasing after the linear region voltage threshold (Vlin) 550, it encounters a limitation imposed by the decagon region 310 near the corners of the particular sector 1 that can not be exceeded.

As such, the magnitude (Vr) of the reference voltage vector is modified at step 650 by multiplying it by the correction factor coefficient k(MI) 710 for the first overmodulation region 420, which is a value bigger than one.

In accordance with the disclosed embodiments, switching times can be implemented according to time intervals t0, t1, t2 are indicated in the expressions (14) as follows:

$$t_1 = T_{pwm} \frac{2\cos\left(\frac{\pi}{5}\right)\sin\left(\frac{\pi}{5}n - \alpha\right)}{\sin\left(\frac{\pi}{5}(3-n) + \alpha\right)};$$

$$t_2 = T_{pwm} \frac{2\cos\left(\frac{\pi}{5}\right)\sin\left(\alpha - (n-1)\frac{\pi}{5}\right)}{\sin\left(\frac{\pi}{5}(3-n) + \alpha\right)};$$

$$t_0 = 0$$

(14)

where $T_{pwm}$ is the pulse width modulation period ($T_{pwm}$), n is the sector number, and α is the angle (α) 542 of the reference voltage vector.

As such, for any angle α, the magnitude (Vr) of the reference voltage vector is multiplied by the correction factor coefficient k(MI) 710 for the first overmodulation region 420 because the decagon region 310 limit is reached when t0 becomes negative, and then the calculation is modified according to equation (14).

When the magnitude (Vr) of the reference voltage vector enters into the decagon region 310, then a switching method is applied according to time intervals (t0, t1, t2) as indicated in the expressions (15) as follows:

$$t_1 = k(MI)MI\frac{\pi T_{pwm}}{5}\frac{\sin\left(\frac{\pi}{5}n - \alpha\right)}{\sin^2\left(\frac{2\pi}{5}\right)};$$

$$t_2 = k(MI)MI\frac{\pi T_{pwm}}{5}\frac{\sin\left(\alpha - \frac{\pi}{5}(n-1)\right)}{\sin^2\left(\frac{2\pi}{5}\right)};$$

$$t_0 = T_{pwm} - t_1 - t_2$$

(15)

where k(MI) is a correction factor coefficient k(MI) 710 that is a function of the modulation index. The correction factor coefficient k(MI) 710 is used only in the first overmodulation region 420 to adjust the magnitude (Vr) of the reference voltage vector and cause the fundamental component of inverter output voltage to be same as its commanded value. In other words, as the magnitude (Vr) of the reference voltage vector approaches the corner of the sector, t0 becomes positive again and equation (BB) is applied since positive t0 can be achieved only until the first voltage threshold (VI) 560 for the first overmodulation region 420 is reached. Beyond the first overmodulation region 420 up to the second overmodulation region 430, there is no t0 anymore.).

As such, when the reference voltage vector is determined to be within the first overmodulation region 420, the overmodulation preprocessor 180 modifies the magnitude of the reference voltage vector, and maintains the angle (α) 542 of the reference voltage vector. Thus, when the overmodulation preprocessor 180 determines (at step 630) that the magnitude (Vr) 540 of the reference voltage vector is determined to be less than or equal to the first voltage threshold (VI) 560 for the first overmodulation region 420 (i.e., the reference voltage vector is within the first overmodulation region 420), the method 600 proceeds to step 650.

Figure 7:
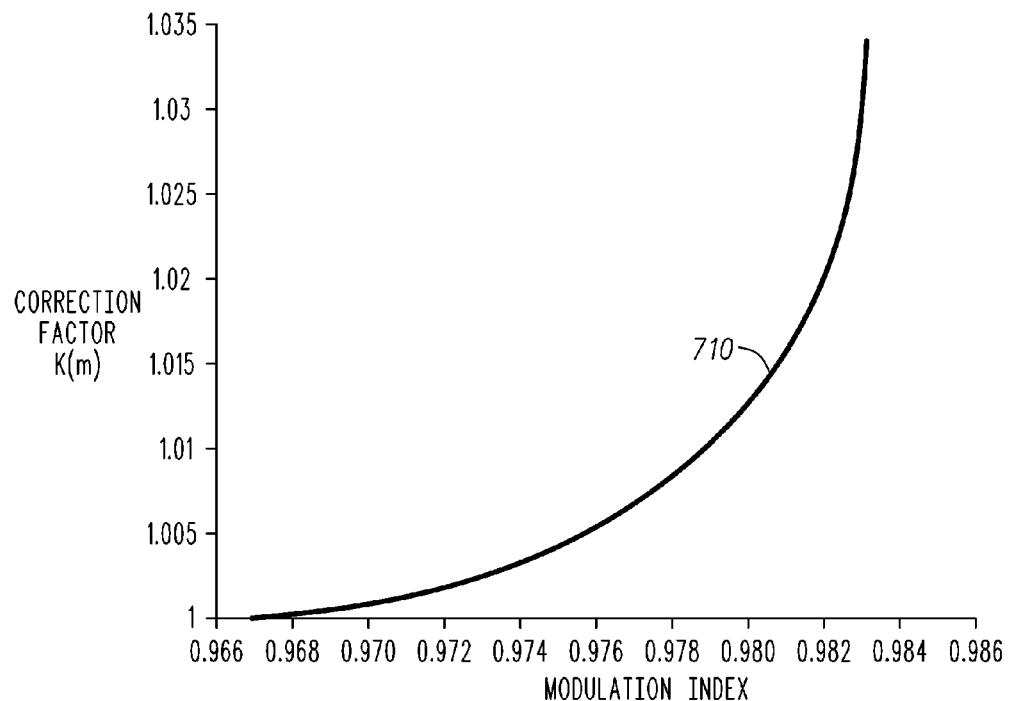
FIG. 7 is a graph that plots correction factor coefficient k(MI) for the first overmodulation region as a function of modulation index (MI) in accordance with some of the disclosed embodiments.

At step 650, the overmodulation preprocessor 180 computes a modified magnitude (Vr*) 602 of the reference voltage vector based on the product of the magnitude (Vr) 540 of the reference voltage vector and the correction factor coefficient k(MI) 710, and sets a modified angle (α*) 604 equal to the angle (α) 542 of the reference voltage vector. FIG. 7 is a graph that plots correction factor coefficient k(MI) 710 for the first overmodulation region 420 as a function of modulation index (MI) in accordance with some of the disclosed embodiments. As shown in FIG. 7, in the first overmodulation region 420, the MI ranges from approximately 0.9669 to 0.9832. As such, the correction factor coefficient k(MI) 710 begins at a value of one (1) for a MI of 0.9669 and increases up to a value of approximately 1.03402 when it reaches a MI of approximately 0.9832, which is the solution of equation (16)

$$\frac{10}{\pi} V_l k \arcsin\left(\frac{V_{lin}}{V_l k}\right) + \frac{10 V_{lin}}{\pi} \ln\left(\frac{V_l k + \sqrt{(V_l k)^2 - V_{lin}^2}}{V_{lin}}\right) - V_l(1 + 4k) = 0$$

(16)

where $$V_l = \frac{\sqrt{5 + 2\sqrt{5}}}{\pi} \ln\left(\frac{2 + \sqrt{5}}{\sqrt{5}}\right) = 0.625919$$

$$V_{lin} = \frac{\sqrt{5 + 2\sqrt{5}}}{5} = 0.615537$$

In one embodiment of step 650, the modified magnitude (Vr*) 602 of the reference voltage vector can be computed using equation (17) as follows:

$$V^*_r = V_r \cdot k(MI)$$

(17)

The method then proceeds to step 670, which will be described below.

Second Overmodulation Region

When the overmodulation preprocessor 180 determines (at step 630) that the magnitude (Vr) 540 of the reference voltage vector is greater than the first voltage threshold (VI) 560 for the first overmodulation region 420, this means that the reference voltage vector is within the second overmodulation region 430 and the method 600 proceeds to step 660.

In second overmodulation region 430, both the magnitude (Vr) 540 and the angle (α) 542 of the reference voltage vector are modified. In particular, the magnitude (Vr) 540 of the reference voltage vector changes gradually from a continuous decagon region 310 to a discrete ten-step switching sequence. The ten-step switching sequence is defined by holding a particular state space vector for one-tenth ($\frac{1}{10}^{th}$) of fundamental period (Tpwm). Reducing modulation index from unity makes particular state space vector held for time that is equivalent to a hold angle ($\alpha_h$(MI)) as indicated in expression (18) as follows:

$$\alpha_h(MI) \in \left[0, \frac{\pi}{10}\right],$$

Figure 8:
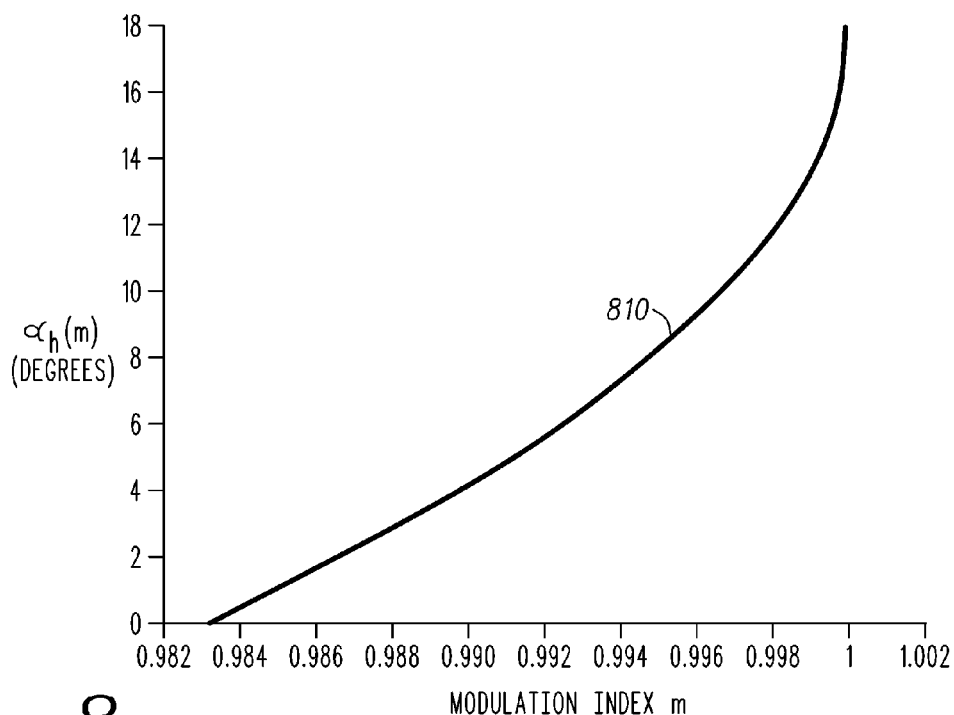
FIG. 8 is a graph that plots hold angle $\alpha_h$(MI) (in degrees) for the second overmodulation region as a function of modulation index (MI) in accordance with some of the disclosed embodiments.

(18).

where the hold angle ($\alpha_h$(MI)) is a function of the modulation index. FIG. 8 is a graph that plots hold angle $\alpha_h$(MI) 810 (in degrees) for the second overmodulation region 430 as a function of modulation index (MI) in accordance with some of the disclosed embodiments. In the second overmodulation region 430, the MI ranges from approximately 0.9832 to 1.0. The hold angle $\alpha_h$(MI) 810 begins at a value of zero degrees for a MI of 0.9832 and increases to a value of approximately 18 degrees when it reaches a MI of approximately 1.0. This hold angle ($\alpha_h$(MI)) is zero on the bound of the first overmodulation region 420. The reference voltage vector follows the shape of the decagon region 310 with switching times calculated appropriately.

In one implementation of step 660, the overmodulation preprocessor 180 computes the modified magnitude (Vr*) 602 and the modified angle (α*) 604 of the reference voltage vector using equation (19) as follows:

$$[V_r^*, \alpha^*] = \begin{cases} [V_n, (n-1)\frac{\pi}{5}], & (n-1)\frac{\pi}{5} \leq \alpha < (n-1)\frac{\pi}{5} + \alpha_h \\ \left[\dfrac{V_{lin}}{\sin\left(\dfrac{5\alpha - 25\alpha_h + (3-n)\pi}{\pi - 10\alpha_h}\dfrac{\pi}{5}\right)}, \dfrac{\alpha - (2n-1)\alpha_h}{\dfrac{\pi}{5} - 2\alpha_h}\dfrac{\pi}{5}\right], & (n-1)\frac{\pi}{5} + \alpha_h \leq \alpha \leq n\frac{\pi}{5} - \alpha_h \\ [V_{n+1}, n\frac{\pi}{5}], & n\frac{\pi}{5} - \alpha_h < \alpha < n\frac{\pi}{5} \end{cases} \quad (19)$$

wherein n represents the sector number (n), and $\alpha_h$ represents the hold angle $\alpha_h$(MI) 810. As shown in equation (19), the modified magnitude (Vr*) 602 and modified angle (α*) 604 of the reference voltage vector vary based on a sector number (n) and a hold angle $\alpha_h$(MI) 810. Each sector n can be divided into three regions defined by the value of the reference angle α. In the first region where α varies from the beginning sector boundary up to $\alpha_h$, the modified magnitude (Vr*) 602 and modified angle (α*) 604 get magnitude and angle values of the switching vector which defines the beginning sector boundary. In the third region when α changes between ending boundary of the sector and angle preceding this boundary for αh, the modified magnitude (Vr*) 602 and modified angle (α*) 604 get magnitude and angle values of the switching vector which defines the ending sector boundary. In the second region which is between first and third region, the modified magnitude (Vr*) 602 gets values corresponding to decagon boundary 310 in the function of modified angle (α*) 604 which has higher angular speed then reference angle α.

Computation of Modified Synchronous Reference Frame Voltage Command Signal Based on Modified Reference Voltage Vector Referring again to FIG. 6, following step 640, 650 or 660, the method 600 then proceeds to step 670, where the overmodulation preprocessor 180 computes a modified synchronous reference frame d-axis voltage command signal (Vd) 182 and a modified synchronous reference frame q-axis voltage command signal (Vq) 184 based on the modified magnitude (Vr*) 602 and the modified angle (α*) 604 of the reference voltage vector that were determined at step 640, 650 or 660. In one embodiment, the modified synchronous reference frame d-axis voltage command signal (Vd) 182 can be computed using equation (20) and the modified synchronous reference frame q-axis voltage command signal (Vq) 184 can be computed using equation (21) as follows:

$$V_d^{} = V_r^{}\cos(\alpha^*) \quad (20)$$

$$V_q^{} = V_r^{}\sin(\alpha^*) \quad (21)$$

Those of skill in the art would further appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions.

To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method for overmodulating a reference voltage vector to optimize voltage command signals that control a five-phase inverter module to increase output voltages generated by the five-phase inverter module, the method comprising:
   determining a magnitude and an angle of the reference voltage vector based on the voltage command signals;
   determining whether the magnitude of the reference voltage vector is less than or equal to a threshold; and
   generating a modified magnitude and a modified angle of the reference voltage vector based on the magnitude of the reference voltage vector and the angle of the reference voltage vector when the magnitude of the reference voltage vector is determined to be less than or equal to the threshold.

2. A method according to claim 1, wherein the step of determining whether the magnitude of the reference voltage vector is less than or equal to a threshold, comprises:
   determining whether the magnitude of the reference voltage vector is less than or equal to a linear region voltage threshold for a linear modulation region to determine whether the reference voltage vector is within the linear modulation region.

3. A method according to claim 2, when the magnitude of the reference voltage vector is determined to be greater than the linear region voltage threshold for the linear modulation region, further comprising the step of:
   determining whether the magnitude of the reference voltage vector is less than or equal to a first voltage threshold for a first overmodulation region to determine whether the reference voltage vector is within the first overmodulation region or a second overmodulation region.

4. A method according to claim 3, when the magnitude of the reference voltage vector is determined to be less than or equal to the first voltage threshold for the first overmodulation region and the reference voltage vector is determined to be within the first overmodulation region, wherein the step of generating a modified magnitude and modified angle ($\alpha^*$) of the reference voltage vector comprises:
   generating a modified magnitude of the reference voltage vector based on the magnitude of the reference voltage vector and a correction factor coefficient and a modified angle of the reference voltage vector that is equal to the angle of the reference voltage vector.

5. A method according to claim 3, when the magnitude of the reference voltage vector is determined to be greater than the first voltage threshold for the first overmodulation region and the reference voltage vector is determined to be within the second overmodulation region, wherein the step of generating a modified magnitude and modified angle ($\alpha^*$) of the reference voltage vector comprises:
   generating a modified magnitude of the reference voltage vector that varies based on a sector number (n) based on a hold angle that is a function of modulation index, and a modified angle of the reference voltage vector that is different than the angle of the reference voltage vector and that varies based on the sector number (n).

6. A method according to claim 5, wherein the step of generating a modified magnitude of the reference voltage vector that varies based on a sector number (n) based on the hold angle that is a function of modulation index, and a modified angle of the reference voltage vector that is different than the angle of the reference voltage vector and that varies based on the sector number (n), comprises:
   generating, when the angle of the reference voltage vector is in a first angular range of the sector, a modified magnitude of the reference voltage vector based on a first active voltage switching vector and a modified angle of the reference voltage vector based on the sector number;
   generating, when the angle of the reference voltage vector is in a second angular range of the sector, a modified magnitude of the reference voltage vector based on the linear region voltage threshold, the angle of the reference voltage vector, the sector number (n) and the hold angle that is a function of modulation index, and a modified angle of the reference voltage vector based on the angle of the reference voltage vector, the sector number (n) and the hold angle; and
   generating, when the angle of the reference voltage vector is in a third angular range of the sector, a modified magnitude of the reference voltage vector based on a second active voltage switching vector, and a modified angle of the reference voltage vector based on the sector number (n).

7. A method according to claim 1, wherein the step of determining a magnitude and an angle of the reference voltage vector based on voltage command signals comprises:
   determining a magnitude and an angle of the reference voltage vector based on a synchronous reference frame d-axis voltage command signal and a synchronous reference frame q-axis voltage command signal.

8. A five-phase system, comprising:
   a five-phase inverter module that generates an output voltages based on voltage command signals that control the five-phase inverter module;
   a five-phase machine driven by the output voltages generated by the five-phase inverter module; and
   an overmodulation processor designed to overmodulate a reference voltage vector to optimize the voltage command signals to increase the output voltages generated by the five-phase inverter module, wherein the overmodulation processor is designed to determine whether a magnitude of the reference voltage vector is less than or equal to a threshold, and generate a modified magnitude and a modified angle of the reference voltage vector based on the magnitude of the reference voltage vector and an angle of the reference voltage vector when the magnitude of the reference voltage vector is determined to be less than or equal to the threshold.

9. A system according to claim 8, wherein the overmodulation processor is designed to determine whether the magnitude of the reference voltage vector is less than or equal to a linear region voltage threshold for a linear modulation region to determine whether the reference voltage vector is within the linear modulation region.

10. A system according to claim 9, when the magnitude of the reference voltage vector is determined to be greater than the linear region voltage threshold for the linear modulation region, wherein the overmodulation processor is designed to determine whether the magnitude of the reference voltage vector is less than or equal to a first voltage threshold for a first overmodulation region to determine whether the reference voltage vector is within the first overmodulation region or a second overmodulation region.

11. A system according to claim 10, when the magnitude of the reference voltage vector is determined to be less than or equal to the first voltage threshold for the first overmodulation region and the reference voltage vector is determined to be within the first overmodulation region, wherein the overmodulation processor is designed to generate a modified magnitude of the reference voltage vector based on the magnitude of the reference voltage vector and a correction factor coefficient.

12. A system according to claim 10, when the magnitude of the reference voltage vector is determined to be greater than the first voltage threshold for the first overmodulation region and the reference voltage vector is determined to be within the second overmodulation region, wherein the overmodulation processor is designed to generate a modified magnitude and a modified angle of the reference voltage vector.

13. A system according to claim 10, when the magnitude of the reference voltage vector is determined to be greater than the first voltage threshold for the first overmodulation region and the reference voltage vector is determined to be within the second overmodulation region, wherein the overmodulation processor is designed to generate a modified magnitude of the reference voltage vector that varies based on a sector number (n) and a hold angle that is a function of modulation index and a modified angle of the reference voltage vector that is different than the angle of the reference voltage vector and that varies based on the sector number (n).

14. A system according to claim 13, when the angle of the reference voltage vector is in a first angular range of the sector, wherein the overmodulation processor is designed to generate a modified magnitude of the reference voltage vector based on a first active voltage switching vector and a modified angle of the reference voltage vector based on the sector number.

15. A system according to claim 14, when the angle of the reference voltage vector is in a second angular range of the sector, wherein the overmodulation processor is designed to generate a modified magnitude of the reference voltage vector based on the linear region voltage threshold, the angle of the reference voltage vector, the sector number (n) and the hold angle that is a function of modulation index, and
a modified angle of the reference voltage vector based on the angle of the reference voltage vector, the sector number (n) and the hold angle.

16. A system according to claim 15, when the angle of the reference voltage vector is in a third angular range of the sector, wherein the overmodulation processor is designed to generate a modified magnitude of the reference voltage vector based on a second active voltage switching vector, and
a modified angle of the reference voltage vector based on the sector number (n).

17. A system according to claim 8, wherein the overmodulation processor is further designed to:
determine the magnitude and the angle of the reference voltage vector based on a synchronous reference frame d-axis voltage command signal and a synchronous reference frame q-axis voltage command signal.

18. A method for overmodulating a reference voltage vector to optimize voltage command signals that controls a five-phase inverter module to increase output voltages generated by the five-phase inverter module, the method comprising:
determining a magnitude and an angle of the reference voltage vector based on synchronous reference frame voltage command signals;
determining whether the magnitude of the reference voltage vector is less than or equal to a linear region voltage threshold for a linear modulation region to determine whether the reference voltage vector is within the linear modulation region;
when the magnitude of the reference voltage vector is determined to be less than or equal to the first voltage threshold for the first overmodulation region and the reference voltage vector is determined to be within the first overmodulation region, generating a modified magnitude of the reference voltage vector based on the magnitude of the reference voltage vector and a correction factor coefficient, and a modified angle of the reference voltage vector that is equal to the angle of the reference voltage vector;
when the magnitude of the reference voltage vector is determined to be greater than the linear region voltage threshold for the linear modulation region, determining whether the magnitude of the reference voltage vector is less than or equal to a first voltage threshold for a first overmodulation region to determine whether the reference voltage vector is within the first overmodulation region or a second overmodulation region; and
when the magnitude of the reference voltage vector is determined to be greater than the first voltage threshold for the first overmodulation region and the reference voltage vector is determined to be within the second overmodulation region, generating a modified magnitude of the reference voltage vector, and a modified angle of the reference voltage vector that is different than the angle of the reference voltage vector.

19. A method according to claim 18, wherein the step of generating a modified magnitude of the reference voltage vector, and a modified angle of the reference voltage vector that is different than the angle of the reference voltage vector, comprises:
generating, when the angle of the reference voltage vector is in a first angular range of the sector, a modified magnitude of the reference voltage vector based on a first active voltage switching vector and a modified angle of the reference voltage vector based on the sector number (n);
generating, when the angle of the reference voltage vector is in a second angular range of the sector, a modified magnitude of the reference voltage vector based on the linear region voltage threshold, the angle of the reference voltage vector, the sector number (n) and the hold angle that is a function of modulation index, and a modified angle of the reference voltage vector based on the angle of the reference voltage vector, the sector number (n) and the hold angle; and generating, when the angle of the reference voltage vector is in a third angular range of the sector, a modified magnitude of the reference voltage vector based on a second active voltage switching vector, and a modified angle of the reference voltage vector based on the sector number (n).

* * * * *